United States Patent
Gunjal et al.

(10) Patent No.: US 10,079,783 B2
(45) Date of Patent: Sep. 18, 2018

(54) METHOD TO CONFIGURE NETWORK BONDS AS A PORT ON AN INTEGRATION BRIDGE FOR A VIRTUALIZED MULTILAYER SWITCH

(71) Applicant: International Business Machines Corporation, Armonk, NY (US)

(72) Inventors: Akash V. Gunjal, Bangalore (IN); John E. McGinn, Rochester, MN (US); Sanket S. Sangwikar, Kalyan (IN)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 14/846,327

(22) Filed: Sep. 4, 2015

(65) Prior Publication Data
US 2017/0070454 A1    Mar. 9, 2017

Related U.S. Application Data

(63) Continuation of application No. 14/845,072, filed on Sep. 3, 2015.

(51) Int. Cl.
*H04L 12/931* (2013.01)
*H04L 12/709* (2013.01)
*H04L 12/46* (2006.01)

(52) U.S. Cl.
CPC ............ *H04L 49/70* (2013.01); *H04L 12/462* (2013.01); *H04L 45/245* (2013.01); *Y02D 50/30* (2018.01)

(58) Field of Classification Search
None
See application file for complete search history.

(56) References Cited

U.S. PATENT DOCUMENTS

| | | | |
|---|---|---|---|
| 8,787,149 B1* | 7/2014 | Ramanathan | H04L 45/58 370/216 |
| 2012/0084400 A1* | 4/2012 | Almadi | H04L 41/069 709/219 |
| 2015/0172112 A1* | 6/2015 | Itkin | H04L 45/245 370/216 |

OTHER PUBLICATIONS

Open Stack; "Open V switch: Configure various Linux networking devices on the compute host"; Open Stack Cloud Software; Open Stack, Online Documents; Jan. 21, 2015; http://docs.openstack.org/admin-guide-cloud/content/under_the_hood_openvswitch.html.
Nakamura; "Network unstable when adding Linux bonding device to OVS bridge"; RDO Community, Online Forum; Red Hat, Open Stack; Jan. 21, 2015; https://openstack.redhat.com/forum/discussion/630/need-helpnetwork-unstable-when-adding-linux-bonding-device-to-ovs-bridge/p1.

(Continued)

Primary Examiner — Jason E Mattis
Assistant Examiner — Hong Shao
(74) Attorney, Agent, or Firm — Patterson + Sheridan, LLP

(57) ABSTRACT

Techniques are disclosed for configuring a physical computing system (e.g., in a cloud computing network) to connect a network bond with a virtual multilayer switch. An operating system process executing in the physical computing system receives a selection of one or more network interfaces. The process aggregates the selected network interfaces into a bonded network interface having a first port. The process creates a network bridge having a second port. The process associates the first port with the second port. The process connects the network bridge with an integration bridge of the virtual multilayer switch via the second port.

5 Claims, 5 Drawing Sheets

(56) References Cited

OTHER PUBLICATIONS

Venu Murthy; "Solving a Common Beginner's Problem When Pinging from an Open Stack Instance"; The New Stack, Technology Tutorials; The New Stack; Jan. 21, 2015; http://thenewstack.io/solving-a-common-beginners-problem-when-pinging-from-an-openstack-instance/.
International Business Machines Corporation, "List of IBM Patents or Patent Applications Treated as Related," Oct. 15, 2015, 2 pages.

* cited by examiner

METHOD TO CONFIGURE NETWORK BONDS AS A PORT ON AN INTEGRATION BRIDGE FOR A VIRTUALIZED MULTILAYER SWITCH

CROSS-REFERENCE TO RELATED APPLICATIONS

This application is a continuation of co-pending U.S. patent application Ser. No. 14/845,072, filed Sep. 3, 2015. The aforementioned related application is herein incorporated by reference in its entirety.

BACKGROUND

Embodiments presented herein generally relate to cloud computing networks, and more specifically, to configuring network bonds to be compatible with a distributed virtualized multilayer switch.

Link aggregation bonds multiple network interface ports logically into a single port. When bonded, the multiple network interfaces appear to be the same physical device. For example, the bonded interface is associated with its own Media Access Control (MAC) address mapped to each physical network interface in the aggregated link. Link aggregation provides increased throughput, redundancy, fault tolerance, and load balancing in a computer network, such as in a cloud computing environment. UNIX-based operating systems (e.g., Linux) provide kernel modules that allow bonding of network interface ports.

Many cloud computing networks rely on distributed multilayer virtual switches to provide a switching stack for virtualized environments and also support multiple protocols and standards used in computer networks. However, certain distributed virtual switches are incompatible with bonded network interfaces created by UNIX-based operating systems. For example, the Open vSwitch (OVS) is an implementation of a distributed virtual switch that supports link aggregation protocols under the 802.1AX-2008 standard. However, OVS does not support standard Linux bonds under the IEEE 802.3AD standard. Consequently, cloud computing networks that want to use such distributed virtual switch implementations are typically unable to use such link aggregation protocols (e.g., the bonded interface would not receive frames passing through the virtual multilayer switch). Instead, such a network has to connect each individual network interface with the distributed virtual switch, which undoes the advantages provided by link aggregation.

SUMMARY

Embodiments presented herein describe a method. The method generally includes receiving a selection of one or more network interfaces. The method also includes aggregating the selected network interfaces into a bonded network interface having a first port. The first port is associated with a network bridge having a second port. The network bridge is connected with an integration bridge of a virtual multilayer switch via the second port.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Figure 1:
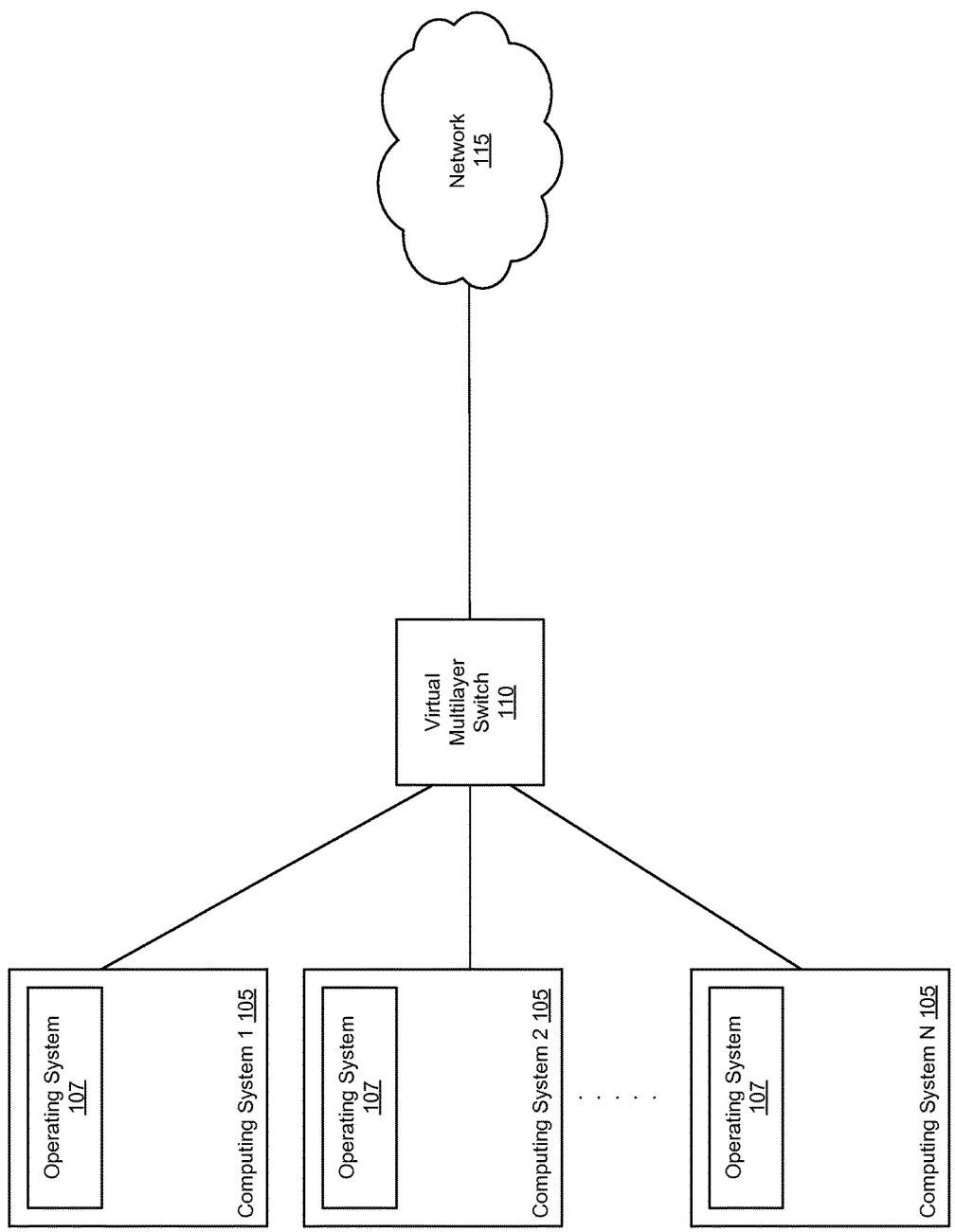
FIG. 1 illustrates an example computing environment, according to one embodiment.

Embodiments presented herein describe techniques for configuring a physical host to connect network bonds to a virtual multilayer switch. Techniques allow the physical host to connect a network bond created using a UNIX-based kernel process to a given virtual multilayer switch. Certain virtual multilayer switch implementations which are commonly deployed in a cloud computing environment do not support UNIX-based network bonds. Instead, these virtual multilayer switches might support other network bonds. For example, Open VSwitch supports link network bonds created from link aggregation protocols such as balance-slb, active-backup, and balance-tcp. However, Open VSwitch is incompatible with UNIX-based network bonds, such as those created from the standard Linux link aggregation protocol.

In one embodiment, a network bridge on a physical host serves as an intermediary between a network bond and the virtual multilayer switch. The physical host may create, through a link aggregation process, a bond from one or more Ethernet interfaces. The bond is a logical network interface that has a distinct network address (e.g., a Media Access Control (MAC) address, IP address, etc.) and port. Thereafter, the physical host may create a UNIX-based network bridge (e.g., a Linux bridge) between the bonded network interface and an integration bridge of the virtual multilayer switch. The integration bridge allows network interfaces to connect to the virtual multilayer switch. In one embodiment, the physical host associates the port of the bonded network interface with the network bridge. Further, the physical host connects the network bridge to a port the integration bridge of the virtual multilayer switch. Doing so allows traffic to flow from the bonded network interface to the virtual multilayer switch, and vice versa.

Advantageously, configuring a UNIX-based network bridge to serve as an intermediary between a UNIX-based network bond and a virtual multilayer switch allows the physical host to use such network bonds, even if the virtual multilayer switch does not generally support those bonds. Indeed, because traffic flows from the bonded network interface to the network bridge and then to the integration bridge of the virtual multilayer switch, traffic appears to virtual multilayer switch as coming from the network bridge. That is, the techniques presented herein allow traffic to flow indirectly from the bonded network interface to the virtual multilayer switch, where the bonded network interface is otherwise unsupported by the virtual multilayer switch.

Note, the following uses bonding by a kernel module of a UNIX-based operating system (e.g., Linux) as a reference example of a link aggregation technique. Further, the following uses a network bridge created by a module of a UNIX-based operating system (e.g., Linux) as a reference example of a network bridge. Further still, the following uses Open VSwitch as a reference example of a distributed virtual multilayer switch that does not support link aggregation by that technique. However, one of skill in the art will recognize that embodiments presented herein may be adapted for various types of link aggregation to virtual switches in situations where a UNIX-based network bridge is compatible with both a given link aggregation technique and given virtual switch implementation. Further, one of skill in the art will recognize that embodiments may be adapted to non-UNIX-based link aggregation techniques having similar compatibility issues with a virtual multilayer switch.

FIG. 1 illustrates an example computing environment 100, according to one embodiment. As shown, computing environment 100 includes multiple computing systems 105. In one embodiment, the computing systems 105 serve as physical hosts for a cloud computing network. As a cluster for the cloud computing network, the computing systems 105 provides shared resources, such as storage, memory, and processing resources. Each of the computing systems 105 execute an operating system 107. In one embodiment, the operating system 107 is UNIX-based (e.g., the Linux operating system).

In one embodiment, the virtual multilayer switch 110 is a software-based distributed switching stack for the cloud computing network. The virtual multilayer switch 110 connects network interfaces provided by the physical hosts and receives, processes, and forwards data to a destination network interface. The virtual multilayer switch 110 supports multiple protocols, such as the Link Aggregation Control Protocol (LACP) and 802.1ag. The virtual multilayer switch 110 may execute on a network host and receive packets from a network 115 and relay the packets to a destination computing system 105. In one embodiment, the virtual multilayer switch 110 is an Open VSwitch application.

Figure 2:
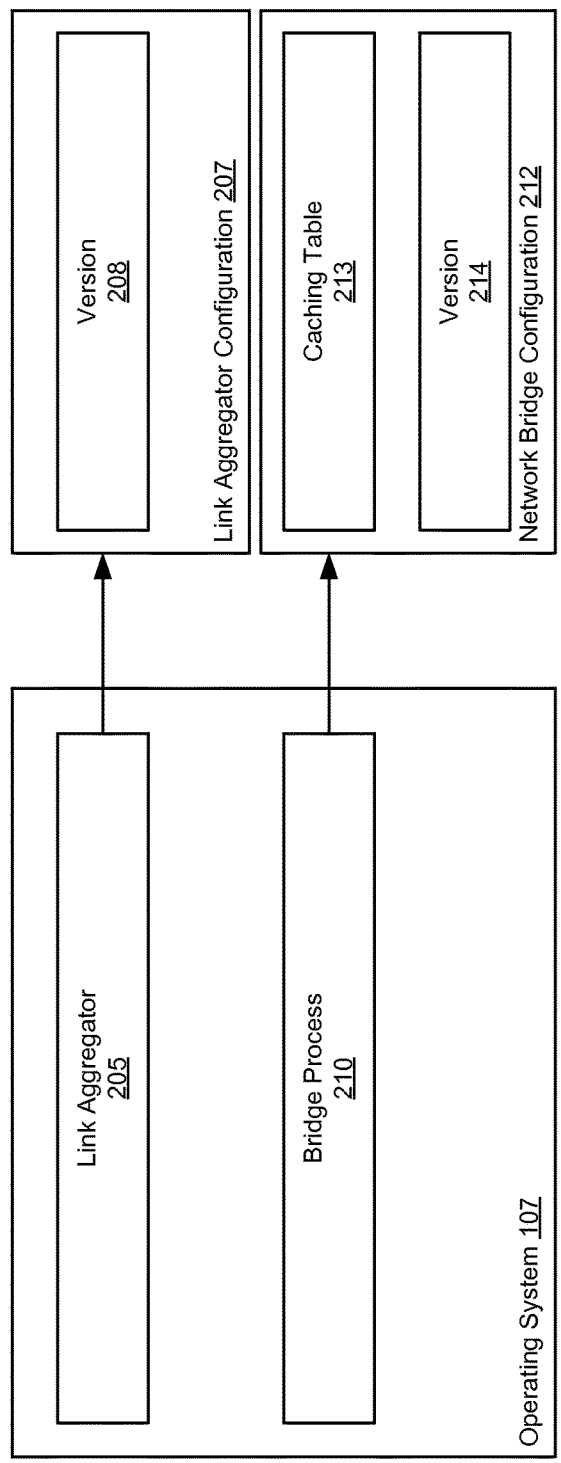
FIG. 2 illustrates operating system processes for configuring network bonds, according to one embodiment.

FIG. 2 illustrates processes in the operating system 107, according to one embodiment. As shown, the operating system includes a link aggregator 205 and a bridge process 210. The link aggregator 205 is a kernel module executing in the operating system 107. In one embodiment, the link aggregator 205 groups one or more network interface (e.g., physical Ethernet interfaces or virtual network interfaces). The link aggregator 205 may specify a version 208 (e.g., in a link aggregator configuration 207).

In one embodiment, the bridge process 210 is a kernel module executing in the operating system 107. The bridge process 210 creates a network bridge. The network bridge allows connections from multiple network interfaces. When a device is connected to the network bridge, the network bridge records, into a MAC caching table 213 (e.g., of a network bridge configuration 212), a network interface information (e.g., network address and port information) used to communicate with a given host. For instance, when the network bridge forwards the frame, the network bridge determines whether a destination MAC address specified in the frame is stored in the caching table 213. If so, the network bridge forwards the frame through the associated port. Further, the network bridge configuration 212 may specify a version 214 of the network bridge.

In one embodiment, the version 208 of the link aggregator 205 may be incompatible with a version of the virtual multilayer switch 110 used within the cloud computing network. That is, directly connecting a port of a network interface bonded by the link aggregator 205 to the virtual multilayer switch 110 may result in packets addressed to the network interface being dropped. However, in one embodiment, the virtual multilayer switch 110 supports the version 214 of the bridge process 210. That is, the bridge process 210 may connect a network bridge to the virtual multilayer switch 110. If connected, traffic may flow from the virtual multilayer switch 110 to the network bridge, and vice versa.

In one embodiment, the bridge process 210 may associate a bonded network interface with a network bridge. To do so, the bridge process 210 may record the MAC address and port of the bonded network interface in the caching table 213. As a result, network traffic flowing from the bonded network interface also passes through the network bridge. Further, doing so allows network traffic to flow from a bonded network interface to the virtual multilayer switch 110, and vice versa. Because the version 214 of the bridge process 210 is compatible with the virtual multilayer switch 110, the network bridge may act as an intermediary between the bonded network interface and the virtual multilayer switch 110.

Figure 3:
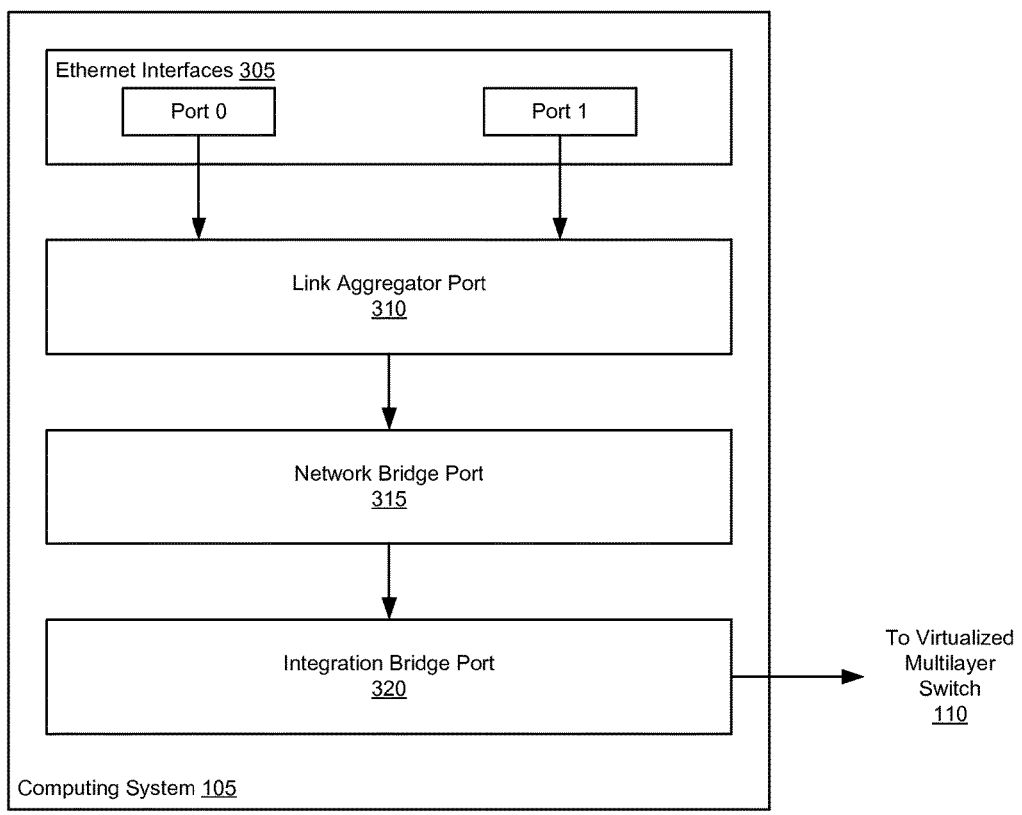
FIG. 3 illustrates an example port diagram, according to one embodiment.

FIG. 3 illustrates a port diagram relative to a computing system 105 of the cloud computing environment, according to one embodiment. As shown, the computing system 105 includes two Ethernet interfaces 305 specifying a port 0 and a port 1. The link aggregator 205 bonds port 0 and port 1 together. As a result of the bonding, ports 0 and 1 are slave Ethernet interfaces of the bonded network interface. The bonded network interface itself is associated with a distinct MAC address and a port (link aggregator port 310).

As stated, the bridge process 210 creates a network bridge having a port 315. The bridge process 210 associates the link aggregator port 310 with the network bridge. As a result, traffic flowing through the link aggregator port 310 passes through the network bridge port 315. In one embodiment, the bridge process 210 connects the network bridge to an integration bridge port 320. In one embodiment, the integration bridge is a virtual switch that receives connections from network interfaces. The integration bridge allows network interfaces to connect to ports of the virtual multilayer switch 110. Connecting the network bridge to the integration bridge allows traffic flowing from the link aggregator port 310 to flow to the virtual multilayer switch 110.

Figure 4:
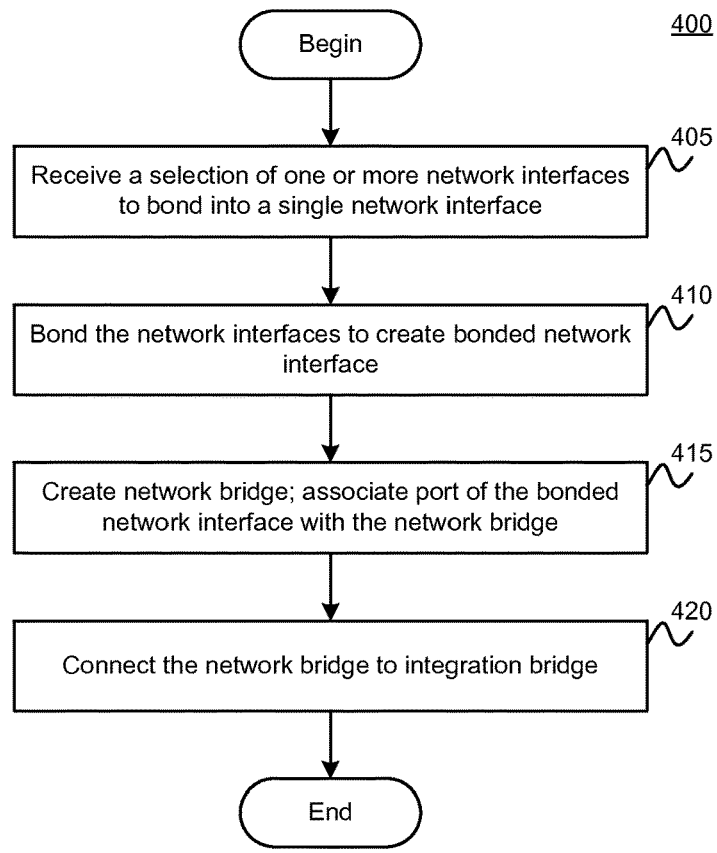
FIG. 4 illustrates a method for connecting a UNIX-based network bond to a virtual multilayer switch, according to one embodiment.

FIG. 4 illustrates a method 400 for configuring a physical host in a cloud computing network to route traffic between a UNIX-based bonded network interface to the virtual multilayer switch 110, according to one embodiment.

At step 405, the link aggregator 205 receives a selection of one or more network interfaces of the physical host to bond to a single network interface. At step 410, the link aggregator 205 bonds the selected network interfaces to create the bonded network interface. As stated, the bonded network interface includes a distinct network address (e.g., a MAC address) and port.

At step 415, the bridge process 210 creates a network bridge. The bridge process 210 associates the port of the bonded network interface with the port of the network bridge. To do so, the bridge process 210 records the MAC address and port of the bonded network interface into a MAC caching table of the network bridge. As a result, when the network bridge receives an Ethernet frame targeted at the bonded network interface, the network bridge can forward the frame to the bonded network interface (e.g., by cross-referencing the destination MAC address specified in the frame with entries in the caching table).

At step 420, the bridge process 210 connects the network bridge with the integration bridge of the virtual multilayer switch 110. The bridge process 210 does so using a specified network address and port of the virtual multilayer switch 110. Connecting the network bridge to the integration bridge allows the bonded network interface to send traffic to the virtual multilayer switch 110 via the network bridge.

Figure 5:
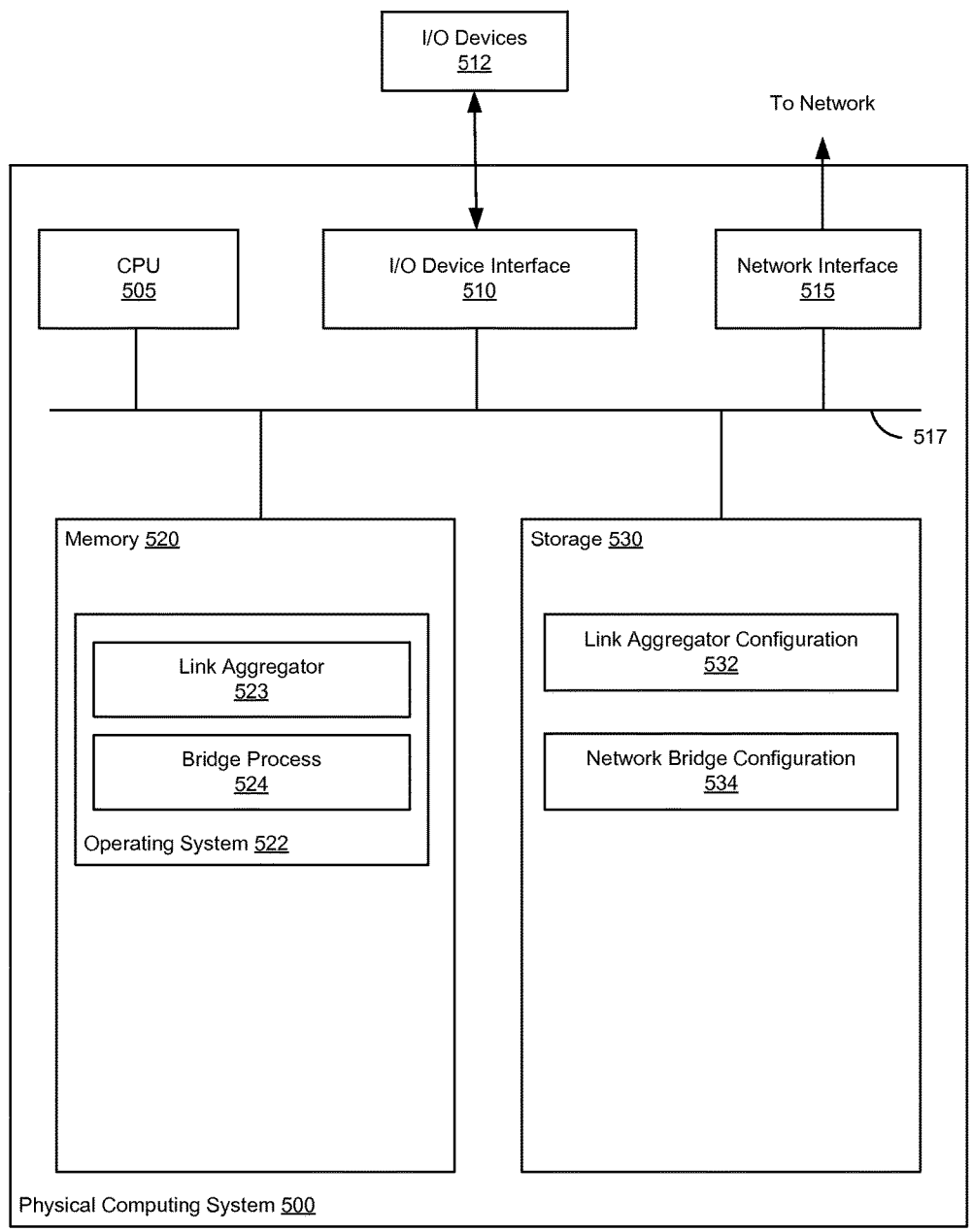
FIG. 5 illustrates a physical computing system configured to connect a UNIX-based network bond to a virtual multilayer switch, according to one embodiment.

FIG. 5 illustrates a physical computing system 500 configured to route traffic between a UNIX-based bonded network interface to a virtual multilayer switch, according to one embodiment. As shown, the computing system 500 includes, a central processing unit (CPU) 505, a network interface 515, a memory 520, and storage 530, each connected to a bus 517. The computing system 500 may also include an I/O device interface 510 connecting I/O devices 512 (e.g., keyboard, display and mouse devices) to the computing system 500. Further, in context of this disclosure, the computing elements shown in the computing system 500 correspond to a physical computing system.

CPU 505 retrieves and executes programming instructions stored in memory 520 as well as stores and retrieves application data residing in the storage 530. The bus 517 is used to transmit programming instructions and application data between CPU 505, I/O devices interface 510, storage 530, network interface 517, and memory 520. Note, CPU 505 is included to be representative of a single CPU, multiple CPUs, a single CPU having multiple processing cores, and the like. Memory 520 is generally included to be representative of a random access memory. Storage 530 may be a disk drive storage device. Although shown as a single unit, storage 530 may be a combination of fixed and/or removable storage devices, such as fixed disc drives, removable memory cards, or optical storage, network attached storage (NAS), or a storage area-network (SAN).

Illustratively, memory 520 includes an operating system 522. And storage 530 includes a link aggregator configuration 532 and a network bridge configuration 534. The operating system 522 itself includes a link aggregator 523 and a bridge process 524. The link aggregator 523 bonds one or more network interfaces of the physical computing system 500 to create a bonded network interface. The bridge process 524 creates a network bridge that links network segments. The bridge process 524 associates a port of a bonded network interface with the network bridge. Further, the bridge process 524 connects the network bridge with a distributed virtual multilayer switch. Doing so allows traffic to flow indirectly between the bonded network interface and the virtual multilayer switch, even if the bonded network interface and the virtual multilayer switch are incompatible with one another. The link aggregator configuration 532 and network bridge configuration 534 may specify a version of the link aggregator 523 and bridge process 524, respectively. Further, the network bridge configuration 534 may contain a caching table used by the network bridge to maintain MAC address and port information of a given network interface.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving a selection of one or more network interfaces;
aggregating the selected network interfaces into a bonded network interface having a first port;
associating the first port with a network bridge having a second port by i) recording a) a media access control address (MAC) of the bonded network interface and b) the first port into a MAC caching table of the network bridge and ii) cross-referencing the MAC caching table to establish a communication link with the bonded interface; and
connecting the network bridge with an integration bridge of a virtual multilayer switch via the second port, wherein the aggregation is performed by a UNIX-based bonding process, wherein a version of the UNIX-based bonding process is incompatible with a version of the integration bridge, wherein a version of the network bridge is compatible with the version of the integration bridge, and wherein the bonded network interface communicates indirectly with the virtual multilayer switch via the network bridge connection with the integration bridge of the virtual multilayer switch.

2. The method of claim 1, further comprising:
routing traffic received over the bonded network interface through the integration bridge via the network bridge.

3. The method of claim 1, wherein the bonded network interface further includes a distinct network address.

4. The method of claim 1, wherein the one or more network interfaces includes at least one of a physical network interface or a virtual network interface.

5. The method of claim 1, wherein the compatible version of the network bridge is part of the aggregation performed by the UNIX-based bonding process, and wherein the compatible version of the network bridge is part of a network of process that establishes an intermediary for the incompatible version of the integration bridge and the multilayer virtual switch.

* * * * *